J. W. Clark,
Molding Teeth.
Nº 81,068. Patented Aug. 18, 1868.
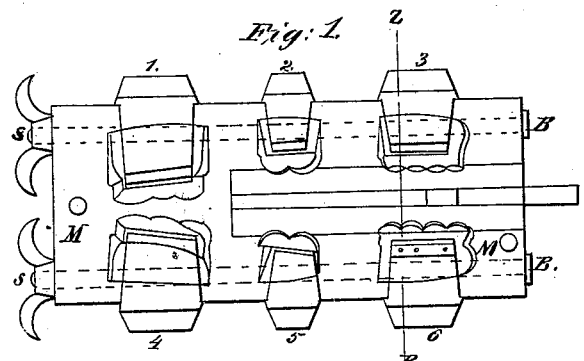
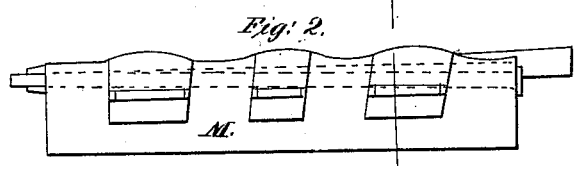
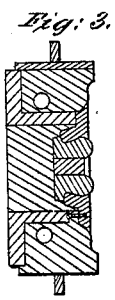
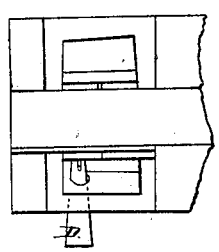
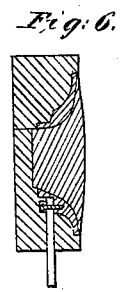
Witnesses:
Charles H. Evans
Isaac R. Oakford
Inventor:
J. Walker Clark

United States Patent Office.

JOHN WALKER CLARK, OF PHILADELPHIA, PENNSYLVANIA.

Letters Patent No. 81,068, dated August 18, 1868.

IMPROVEMENT IN ARTIFICIAL TEETH.

The Schedule referred to in these Letters Patent and making part of the same.

TO ALL WHOM IT MAY CONCERN:

Be it known that I, JOHN WALKER CLARK, of the city of Philadelphia, in the county of Philadelphia, and State of Pennsylvania, have invented a new and useful Improvement in the Manufacture of "Artificial Teeth;" and I do hereby declare that the following is a full, clear, and exact description thereof, reference being had to the accompanying drawings, and to the letters of reference marked thereon.

Figure 1 is a top view of my mould.
Figure 2 is a side view of same.
Figure 3 is a sectional view on $z\ y$.
Figure 4 is a view of my double-notched pin.
Figures 5 and 6 are top and sectional views of moulds, showing another way of accomplishing the same purpose.

The object of my invention is to overcome the difficulty experienced by the dental trade in securing the teeth by means of pins. In the present style of moulds used by the trade, the pins are inserted in the proper position in an opening made sufficiently large to admit of the head. Now, it has been the source of considerable difficulty to keep the pin in a vertical position, and, at the same time, to allow the proper form to the teeth and gums, the pins being liable to incline so as not to take hold in the place desired; also, by the arrangement of notches on the end of the pin, I am enabled to secure the pin firmly to the teeth.

To enable others skilled in the art to make and use my invention, I will now proceed to describe its construction and operation.

I make my mould M, fig. 1, of the usual form and material, and in which there are arranged dies, 1, 2, 3, 4, 5, and 6, made separate, and fitting into the side of the mould, and secured in proper position by means of bolts, B, and thumb-screw, S. The notched pin P, fig. 4, used for securing the teeth to the plate, is made of the ordinary size of material, with two notches on the end.

In the dies 1, 2, 3, 4, 5, and 6, are cut slots, corresponding with the diameter of the pin P; the head of said pin is placed down, and the shank of the pin passes up through the slots in the dies, and are thus held in a vertical and firm position, so that the top of the mould M can be moved, without disarranging them. When the dies 1, 2, 3, 4, 5, and 6 are in, and the pins P in proper position, the bolts B are inserted, and tightened up by the thumb-screw S. Now, the material is pressed in in the usual manner, and passing in and around the notches of the pins, thus secures the pins firmly to the teeth.

After the teeth and gums are moulded, with the pins P firmly secured in place, the dies 1, 2, 3, 4, 5, and 6 are drawn out from the sides of the mould M, thus leaving the proper form to the teeth and gums.

The same purpose can be accomplished, as shown in figs. 5 and 6, by means of a slide, D, notched at one end to suit the diameter of the pin, and passing through the side of the mould.

Having thus described my invention, its construction and operation, what I claim as new, and desire to secure by Letters Patent of the United States, is—

1. The arrangement of the double-notched pin P, and the manner of securing the same in proper position by means of notches in dies 1, 2, 3, 4, 5, and 6, and slide D.

2. The manner of arranging the dies 1, 2, 3, 4, 5, and 6, and drawing them out from the sides of the moulds; also, the arrangement of bolts B and thumb-screw S for securing said dies firmly in place.

J. WALKER CLARK.

Witnesses:
CHARLES H. EVANS,
ALVIN C. GOELL.